(12) United States Patent
Corvinelli et al.

(10) Patent No.: US 12,321,346 B2
(45) Date of Patent: Jun. 3, 2025

(54) ADAPTIVE QUERY OPTIMIZATION USING MACHINE LEARNING

(71) Applicant: International Business Machines Corporation, Armonk, NY (US)

(72) Inventors: Vincent Corvinelli, Mississauga (CA); Calisto Zuzarte, Pickering (CA); Vinith Suriyakumar, Ottawa (CA); Joel Raymond Scarfone, London (CA); Diana Koval, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/452,652

(22) Filed: Jun. 26, 2019

(65) Prior Publication Data
US 2020/0409948 A1   Dec. 31, 2020

(51) Int. Cl.
*G06F 16/2453* (2019.01)
*G06N 20/00* (2019.01)

(52) U.S. Cl.
CPC ......... *G06F 16/2453* (2019.01); *G06N 20/00* (2019.01)

(58) Field of Classification Search
CPC . G06F 16/9535; G06F 3/0484; G06F 16/2453
See application file for complete search history.

(56) References Cited

U.S. PATENT DOCUMENTS

| | | | |
|---|---|---|---|
| 6,108,648 A | 8/2000 | Lakshmi | |
| 6,353,818 B1 | 3/2002 | Carino, Jr. | |
| 6,763,359 B2 | 7/2004 | Lohman | |
| 7,636,735 B2 | 12/2009 | Haas | |
| 8,099,410 B2 | 1/2012 | Day | |
| 9,189,523 B2 | 11/2015 | Ganapathi | |
| 10,740,333 B1 * | 8/2020 | Betawadkar-Norwood | G06F 16/2458 |
| 2002/0103793 A1 | 8/2002 | Koller | |
| 2008/0133454 A1 | 6/2008 | Markl | |
| 2009/0144229 A1 | 6/2009 | Meijer | |
| 2016/0034530 A1 | 2/2016 | Nguyen | |
| 2016/0260011 A1 | 9/2016 | Corvinelli | |
| 2016/0275398 A1 | 9/2016 | Corvinelli | |
| 2017/0193398 A1 | 7/2017 | Schmidt | |

(Continued)

OTHER PUBLICATIONS

"Adaptive Query Optimization in Postgresql", PGCon 2017 The PostgreSQL Conference, 1 page.

(Continued)

*Primary Examiner* — Courtney Harmon
(74) *Attorney, Agent, or Firm* — Caleb D. Wilkes

(57) ABSTRACT

A computer implemented method for processing database queries includes receiving a query and a set of runtime metrics corresponding to the query, wherein the query includes a set of elements, generating a set of encoded elements corresponding to the set of elements, processing the set of encoded elements and the set of runtime metrics to identify one or more possibly query classifications, determining a query execution plan according to the identified one or more possible query classifications, and executing the query according to the determined query execution plan. The computer implemented method may additionally include providing one or more runtime metrics corresponding to the executed query. A computer program product and a computer system corresponding to the method are also disclosed.

20 Claims, 5 Drawing Sheets

(56) References Cited

U.S. PATENT DOCUMENTS

| | | | |
|---|---|---|---|
| 2017/0323200 A1 | 11/2017 | Corvinelli | |
| 2018/0089271 A1* | 3/2018 | Kosuru | G06K 9/6247 |
| 2018/0131645 A1* | 5/2018 | Magliozzi | G06F 40/30 |
| 2018/0276277 A1* | 9/2018 | Wang | G06F 16/24545 |
| 2019/0384845 A1* | 12/2019 | Saxena | G06F 16/24545 |
| 2020/0034357 A1* | 1/2020 | Panuganty | G06F 16/243 |
| 2020/0272667 A1* | 8/2020 | Ding | G06F 16/906 |
| 2020/0409949 A1* | 12/2020 | Saxena | G06F 9/505 |

OTHER PUBLICATIONS

Boulos et al., "A Neural Networks Approach for Query Cost Evaluation", (2001), printed Jan. 29, 2019, 16 pages.

Boulos et al., "Cost Estimation of User-Defined Methods in Object-Relational Database Systems", SIGMOD Record, vol. 28, No. 3, Sep. 1999, 7 pages.

Chaudhuri et al., "Optimization of Queries with User-defined Predicates", Proceedings of the 22nd VLDB Conference, Mumbai(Bombay), India, 1996, pp. 87-98.

Farias et al., A Machine Learning Approach for SQL Queries Response Time Estimation in the Cloud, Simposio Brasileiro de Banco de Dados—SBBD 2013 Short Papers, printed Jan. 29, 2019, 6 pages.

He et al., "Self-Tuning Cost Modeling of User-Defined Functions in an Object-Relational DBMS", ACM Transactions on Database Systems, vol. 30, No. 3, Sep. 2005, pp. 812-853.

He et al., "Self-tuning UDF Cost Modeling Using the Memory-Limited Quadtree", E. Bertino et al. (Eds.): EDBT 2004, LNCS 2992, pp. 513-531, 2004. Springer-Verlag Berlin Heidelberg 2004.

Kraska et al., The Case for Learned Index Structures, arXiv:1712.01208v3 [cs.DB] Apr. 30, 2018, 30 pages.

Liu et al., "Cardinality Estimation Using Neural Networks", CASCON '15 Proceedings of the 25th Annual International Conference on Computer Science and Software Engineering, Nov. 2-4, 2015, pp. 53-59.

Wu et al., "Predicting Query Execution Time: Are Optimizer Cost Models Really Unusable?", Computer Sciences Department, University of Wisconsin, Madison, WI, USA, printed Jan. 29, 2019, 18 pages.

Zhang et al., "Statistical Learning Techniques for Costing XML Queries", Proceedings of the 31st VLDB Conference, Trondheim, Norway, 2005, 12 pages.

Ganapathi et al., "Predicting Multiple Metrics for Queries: Better Decisions Enabled by Machine Learning", IEEE International Conference on Data Engineering, 12 pages, © 2009 IEEE, DOI 10.1109/ICDE.2009.130.

Marcus et al., "Deep Reinforcement Learning for Join Order Enumeration", arXiv:1803.00055v2 [cs.DB] Mar. 12, 2018, 7 pages.

Ortiz et al., "Learning State Representations for Query Optimization with Deep Reinforcement Learning", arXiv:1803.08604v1 [cs.DB] Mar. 22, 2018, 5 pages.

\* cited by examiner

ADAPTIVE QUERY OPTIMIZATION USING MACHINE LEARNING

BACKGROUND OF THE INVENTION

The present invention relates generally to the field of query execution, and more specifically to optimizing query execution using machine learning.

Data warehousing often relies on the use of complex analytical queries to provide customers with important insights. The fast processing of these queries relies on the query optimizer of these data warehouses. Query optimizers analyze the different possible execution plans of a query, and use a cost-based estimate to pick the best one.

SUMMARY

As disclosed herein, a computer implemented method for processing database queries includes receiving a query and a set of runtime metrics corresponding to the query, wherein the query includes a set of elements, generating a set of encoded elements corresponding to the set of elements, processing the set of encoded elements and the set of runtime metrics to identify one or more possibly query classifications, determining a query execution plan according to the identified one or more possible query classifications, and executing the query according to the determined query execution plan. A computer program product and a computer system corresponding to the method are also disclosed.

DETAILED DESCRIPTION

When tasked with new, sometimes complex and analytical execution plans, current cost-based estimates can be inaccurate. Inaccurate estimates often result in the query taking unexpectedly long to run. These long runtimes can lead to a poor client experience, longer time to market for clients, and increased and unexpected labor times. Current methods for optimizing or speeding up queries rely on human intervention through query tuning.

Machine learning has provided companies with drastic improvements to problems such as machine translation, image recognition, and sentiment analysis. Most of these problems fall into the classification domain of machine learning. Different methods for performing classification that exist include: support vector machines, logistic regression, neural networks, Bayesian networks, random forests, and clustering. In the field of machine translation, machine learning has outperformed systems that were crafted over the course of 15 years.

Embodiments of the present invention provide new systems that utilize machine learning to achieve faster query execution speeds than the current cost-based query optimizers. Embodiments of the present invention utilize machine learning models such as recurrent neural networks and random forests to abstract complex patterns from queries and their optimal execution plans to achieve more accurate execution plan selection for unseen queries. These models can be used to enhance current cost-based optimizers or could also be used to fully replace cost-based optimizers.

The present invention will now be described in detail with reference to the Figures. Implementation of embodiments of the invention may take a variety of forms, and exemplary implementation details are discussed subsequently with reference to the Figures. It should be appreciated that, while many of the embodiments discussed are directed towards the Structured Query Language (SQL), any language capable of executing queries with respect to data storage architectures may be implemented in various alternate embodiments of the present invention.

Figure 1:
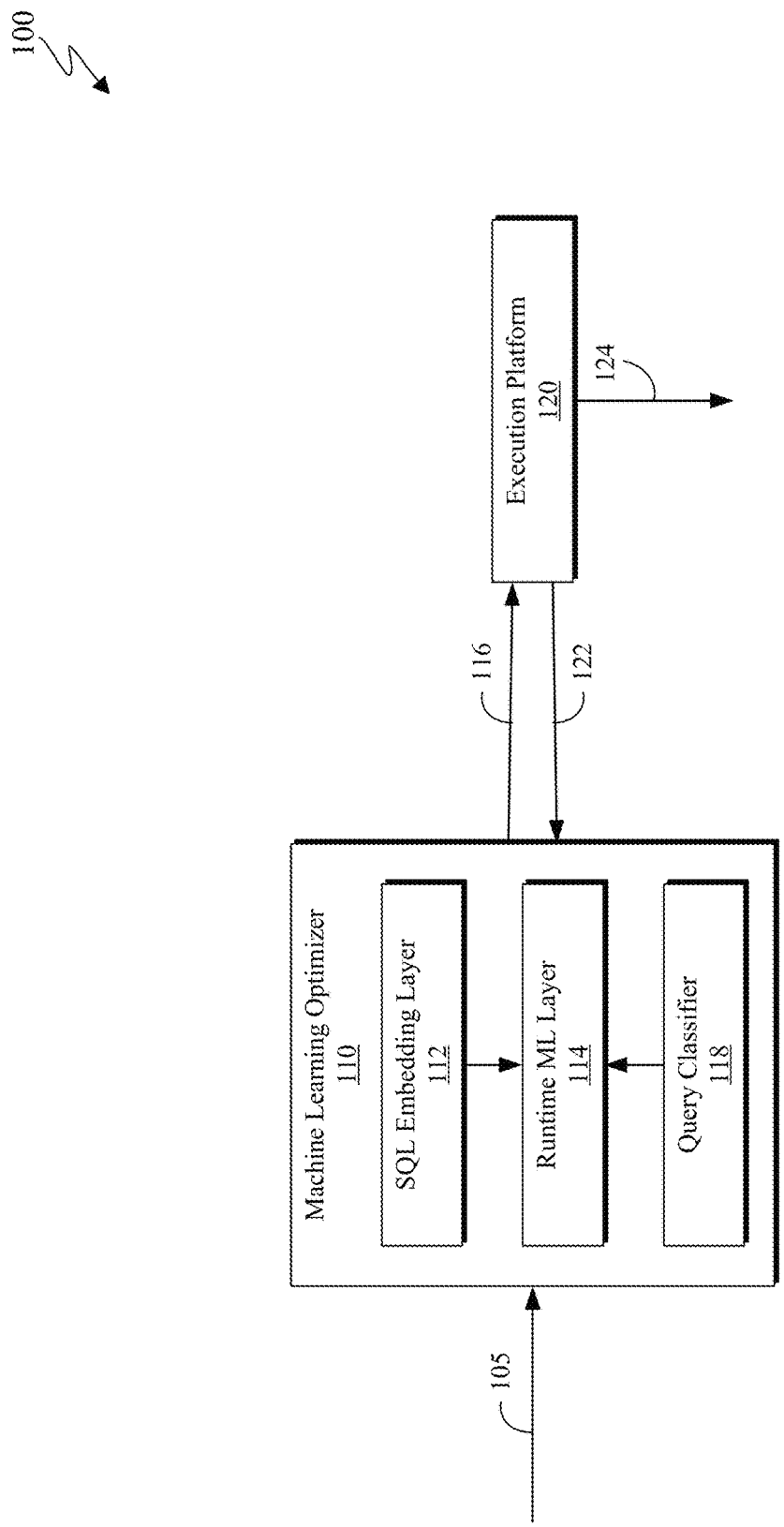
FIG. 1 is a block diagram depicting a query optimization system in accordance with at least one embodiment of the present invention.

FIG. 1 is a block diagram depicting a query optimization system 100 in accordance with at least one embodiment of the present invention. As depicted, query optimization system 100 includes SQL query 105, machine learning optimizer 110, query execution plan 116, execution platform 120, runtime feedback 122, and return data 124. Query optimization system 100 may enable increased efficiency in query optimization.

Machine learning optimizer 110 is configured to generally apply machine learning techniques to a query optimization scenario. As depicted, machine learning optimizer 110 includes a SQL embedding layer 112, a runtime machine learning layer 114, and a query classifier 118. SQL embedding layer 112 may be configured to receive SQL query 105. SQL query 105 may correspond to a database query comprising one or more elements, wherein each element may include a word, term, or instruction. SQL embedding layer 112 may be configured to process SQL text to provide encoded SQL text as an output. An exemplary embodiment of a SQL embedding layer 112 is discussed with respect to FIG. 2.

Runtime machine learning layer 114 may be configured to receive an encoded query and optionally a set of query classes. The encoded query may be provided by SQL embedding layer 112. In at least one embodiment, the encoded query includes a vector space corresponding to encoded text from the SQL query. The set of query classes may be provided by query classifier 118. Runtime ML layer 114 may be configured to output a set of probabilities indicating likelihoods of the original query being classified into each of a set of classes. The probability that a query belongs to a class is identified according to how closely the query's elements match elements from known queries existing in said class. In at least one embodiment, each class represents a join order, join type, and an access type, and effectively describes a query execution plan. Runtime ML layer 114 may be configured to select the class corresponding to the highest outputted probability as the predicted class. A softmax regression layer may be utilized to perform this operation. In an exemplary embodiment, runtime ML layer 114 is configured to use a multi-hidden layer recurrent neural network (RNN) to execute relevant processing. The RNN may iterate through each encoded word from a SQL query and learn to abstract different patterns from the class which the query is a part of. In at least one embodiment, the classes are each a one hot encoding which corresponds to a type of execution plan, such as query execution plan 116. Runtime ML layer 114 may additionally be configured to provide query execution plan 116 to a platform capable of executing query execution plan 116.

Query classifier 118 may be configured to receive an encoded query and a set of runtime metrics. In at least one embodiment, the set of runtime metrics includes elapsed time, CPU consumption and memory usage. The encoded query may be provided by SQL embedding layer 112. In at least one embodiment, the encoded query includes a vector space corresponding to encoded text from the SQL query. Query classifier 118 may be configured to perform a search of query execution plans. The search algorithm can be any method, including but not limited to exhaustive search, heuristic search, or random search. In at least one embodiment, a hybrid search is used wherein a heuristic search is applied to complex queries and exhaustive search is applied otherwise. Query classifier 118 may additionally be configured to provide each query execution plan 116 to a platform capable of executing query execution plan 116.

Execution platform 120 may be configured to receive query execution plan 116 from runtime ML layer 114. In at least one embodiment, execution platform 120 is configured to execute a query according to the received query execution plan 116. Execution platform 120 may be configured to communicate with a data storage architecture according to query execution plan 116 such that the query can be executed with respect to the relevant data storage architecture.

Runtime feedback 122 may include data corresponding to the results of the executed query. In at least one embodiment, runtime feedback 122 includes elapsed runtime for the query. The runtime feedback 122 may additionally include other runtime metrics such as CPU consumption and memory usage. In at least one embodiment, runtime feedback 122 is provided responsive to the execution of the query according to the query execution plan 116. The runtime feedback 122 may additionally include any errors encountered by the query, or any additional data corresponding to the execution of the query. Return data 124 may include one or more results yielded by execution of the query.

Figure 2:
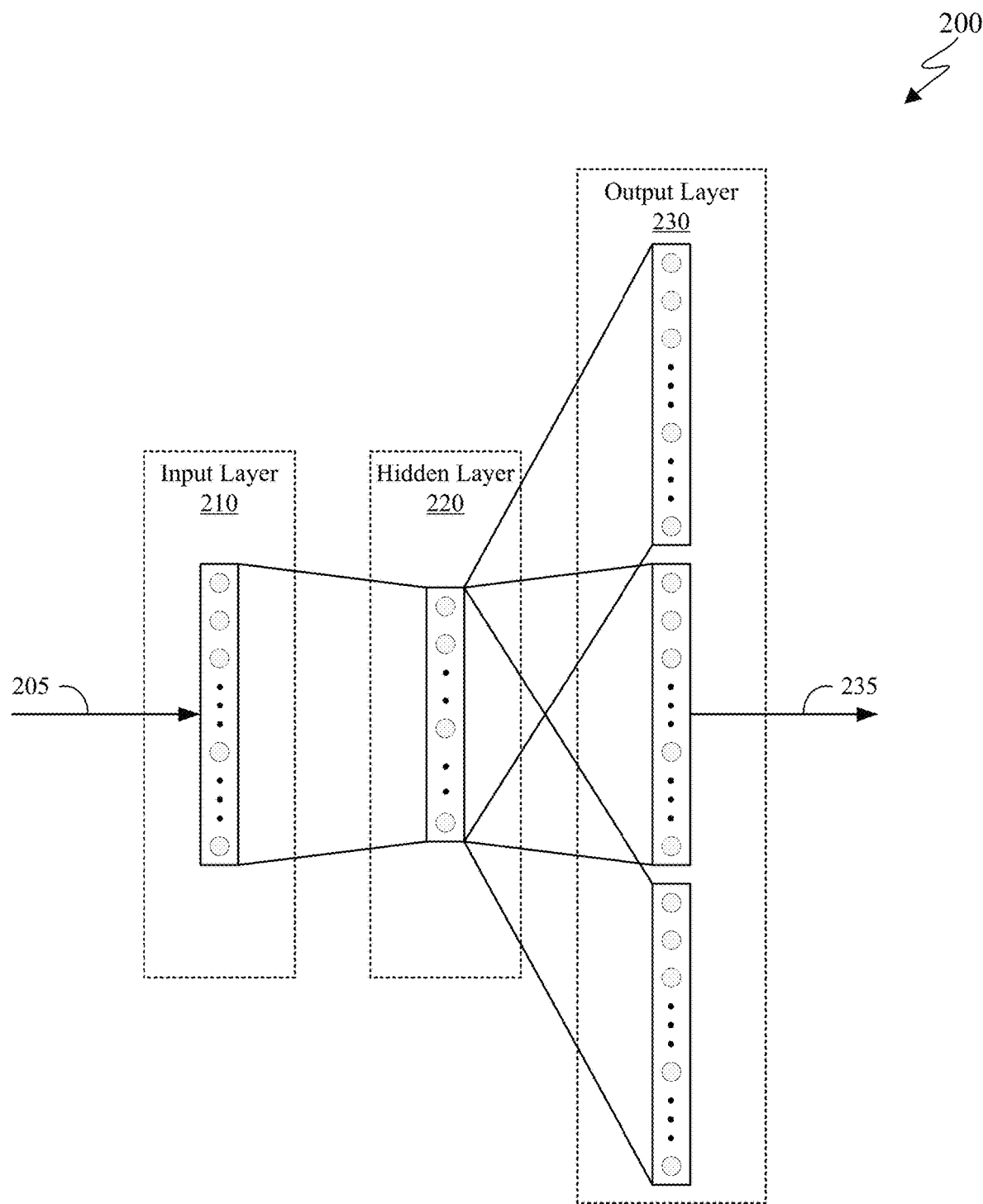
FIG. 2 depicts a SQL embedding layer in accordance with at least one embodiment of the present invention.

FIG. 2 depicts a SQL embedding layer 200 in accordance with at least one embodiment of the present invention. As depicted, the SQL embedding layer includes SQL text 205, input layer 210, hidden layer 220, output layer 230, and encoded SQL text 235. In at least one embodiment, SQL embedding layer is configured to utilize a Word2vec model to create word embeddings. FIG. 2 will be discussed below using Word2vec modeling as an exemplary embodiment, but it should be appreciated that any number of modeling techniques may be used to produce word embeddings.

Word2vec models are shallow, two-layer neural networks that are trained to reconstruct linguistic contexts of words. Word2vec takes as its input a large body of text, such as SQL text 205 with respect to the depicted embodiment, and produces a vector space, which can be outputted as encoded SQL text 235. The SQL text 205 is received by the input layer 210, which is configured to create a vector corresponding to each unique SQL word contained in the SQL text 205. For a given unique SQL word, each vector associates the given word with schema data included in a query, depicted by hidden layer 220, which may include any available schema data associated with the query (such as column names, table names, etc.). Vectors that correspond to SQL words which share common attributes, such as a common context, may be clustered together by the output layer 230 (depicted by the three separate groupings in output layer 230). The created vector spaces, or clusters, created by the SQL embedding layer 200 are provided as encoded SQL text 235.

Figure 3:
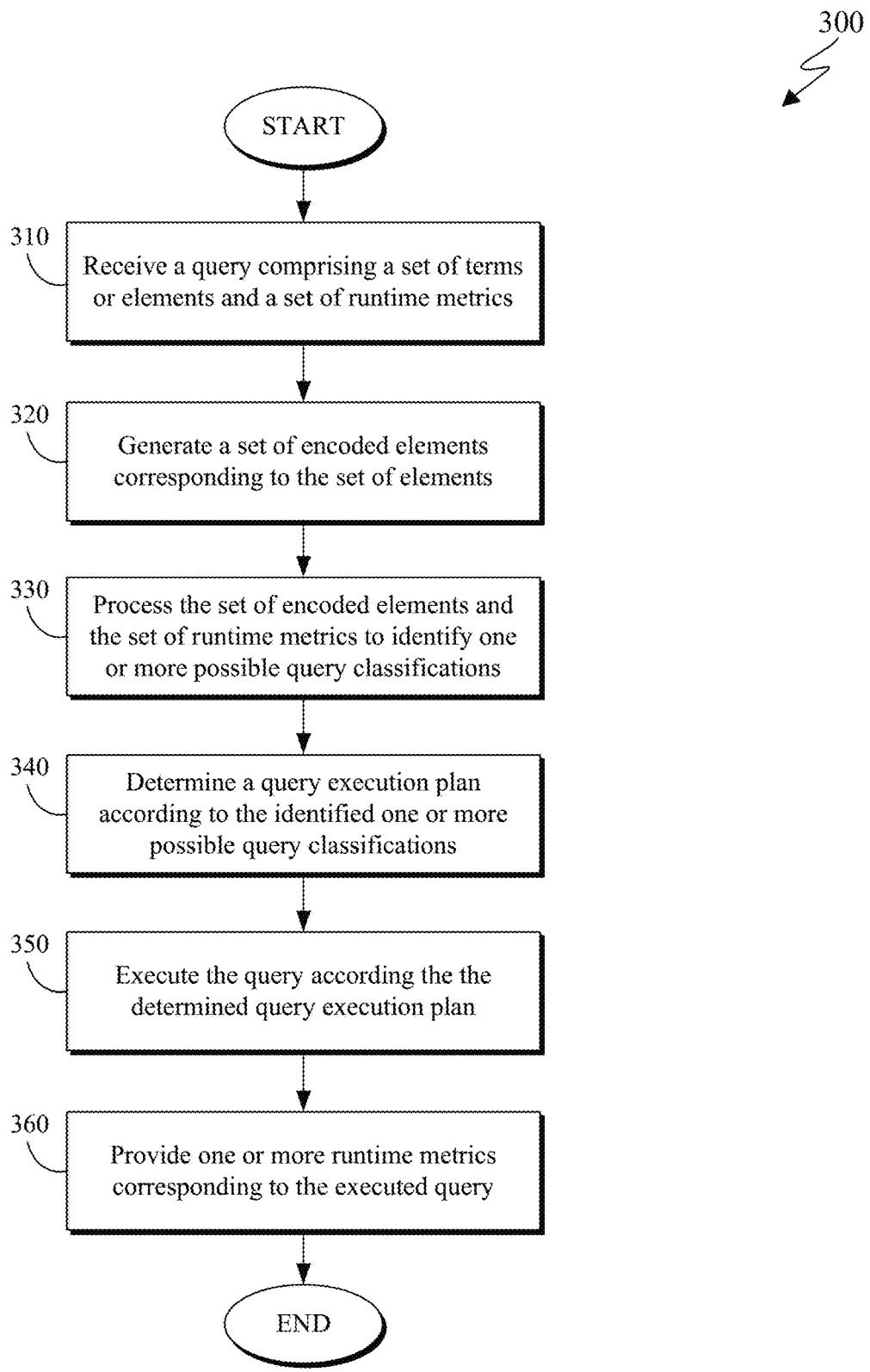
FIG. 3 is a flowchart depicting a query optimization method in accordance with one embodiment of the present invention.

FIG. 3 is a flowchart depicting a query optimization method 300 in accordance with at least one embodiment of the present invention. As depicted, query optimization method 300 includes receiving (310) a query comprising a set of elements, generating (320) a set of encoded elements corresponding to the set of elements, processing (330) the set of encoded elements to identify one or more possibly query classifications, determining (340) a query execution plan according to the identified one or more possible query classifications, executing (350) the query according to the determined query execution plan, and providing (360) one or more runtime metrics corresponding to the executed query. Query optimization method may enable increased efficiency in query execution in machine learning scenarios.

Receiving (310) a query comprising a set of elements and a set of runtime metrics may include receiving a database query. The one or more elements may each correspond to one or more words, terms, phrases, or instructions.

Generating (320) a set of encoded elements corresponding to the set of elements may include processing the set of elements using a SQL embedding layer, such as the SQL embedding layer discussed with respect to FIG. 2. In at least one embodiment, generating (320) a set of encoded elements includes creating a vector corresponding to each element in the received query. For a given unique element, each vector associates the given element with schema data included in a query, which may include any available schema data associated with the query (such as column names, table names, etc.). Vectors that correspond to elements which share common attributes, such as a common context, may be clustered together. The created vector spaces, or clusters, may be provided as output, henceforth referred to as a set of encoded elements.

Processing (330) the set of encoded elements to identify one or more possible query classifications may include analyzing the set of encoded elements using a runtime layer, such as the one discussed with respect to FIG. 1. Processing (330) the set of encoded elements may include determining how closely the set of encoded elements correspond to elements from queries which are confirmed to belong to a given classification. In at least one embodiment, processing (330) the set of encoded elements yields a set of probabilities indicating likelihoods of the original query being classified into each of a set of classes. In at least one embodiment, each class represents a join order, join type and an access type, and effectively describes a query execution plan. Processing (330) the set of encoded elements may include selecting the class corresponding to the highest outputted probability as the predicted class. In at least one embodiment, processing (330) the set of encoded elements includes using a multi-hidden layer recurrent neural network (RNN) to execute relevant processing. The RNN may iterate through each encoded word from a SQL query and learn to abstract different patterns from the class which the query is a part of. In at least one embodiment, the classes are each a one hot encoding which corresponds to a type of execution plan.

Determining (340) a query execution plan according to the identified one or more possible query classifications may include identifying a most probable query classification. The most probable query classification may correspond to the classification with the highest calculated likelihood corresponding to the received query. Based on the most probable query classification, a query execution plan may be selected from query execution plans that have been executed with respect to other query's sharing the same classification. In at least one embodiment, determining (340) a query execution plan may include combining execution plans from more than one of the identified one or more possible query classifications. For example, if a query is 50% likely to belong to query classification A and 50% likely to belong to query classification B, the determined query execution plan may correspond to a combination of a query execution plan from classification A and a query execution plan from classification B.

Executing (350) the query according to the determined query execution plan may include receiving the determined query execution plan 116. In at least one embodiment, executing (350) the query includes executing the received query according to the received query execution plan. Executing (350) the query may include communicating with a data storage architecture according to the query execution plan such that the query can be executed with respect to the relevant data storage architecture.

Providing (360) one or more runtime metrics corresponding to the executed query may include providing data corresponding to the results of the executed query. In at least one embodiment, providing (360) one or more runtime metrics includes providing elapsed runtime for the query. The runtime metrics may additionally include CPU consumption and memory usage. In at least one embodiment, providing (360) one or more runtime metrics occurs responsive to execution of the query according to the query execution plan. The one or more runtime metrics corresponding to the executed query may additionally include any errors encountered by the query, or any additional data corresponding to the execution of the query. The one or more runtime metrics may additionally include one or more results yielded by execution of the query.

Figure 4:
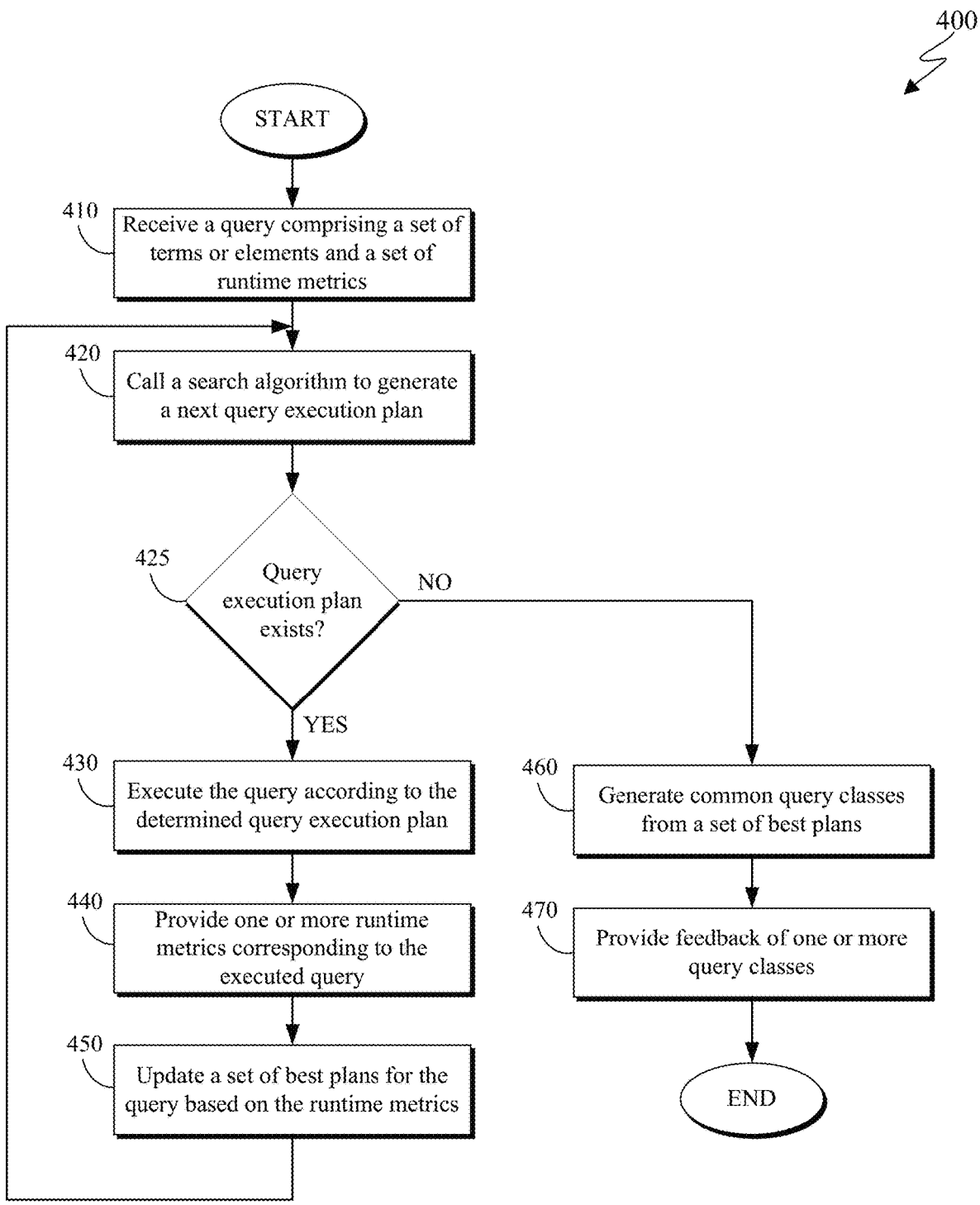
FIG. 4 is a flowchart depicting a query classifier method in accordance with at least one embodiment of the present invention.

FIG. 4 is a flowchart depicting a query classifier method 400 in accordance with at least one embodiment of the present invention. As depicted, query classifier method 400 includes receiving (410) a query comprising a set of elements and a set of runtime metrics, calling (420) a search algorithm to generate the next query execution plan, determining (425) whether a query execution plan exists, executing (430) the query according to the determined query execution plan, providing (440) one or more runtime metrics corresponding to the executed query, updating (450) a set of best plans for the query based on the runtime metrics, generating (460) a set of common query classes from the set of best plans, and providing (470) feedback of one or more query classes.

Receiving (410) a query comprising a set of elements and a set of runtime metrics may include receiving any form of database query. The one or more elements may each correspond to one or more words, terms, phrases, or instructions.

Iteratively calling (420) a search algorithm to generate the next query execution plan until all plans are processed may include calling an exhaustive, heuristic, or random search algorithm that generates a set of query execution plans that can be used to execute the query.

Determining (425) whether a query execution plan exists may include conducting a search to identify an execution plan corresponding to the received query exists. If a query execution plan does exist (425, yes branch), the method continues by executing (430) the query according to the determined query execution plan. If a query execution plan does not exist (425, no branch), the method continues by generating (460) common query classes from a set of best plans.

Executing (430) the query according to the determined query execution plan may include receiving the generated query execution plan from 420. In at least one embodiment, executing (430) the query includes executing the received query according to the received query execution plan. Executing (430) the query may include communicating with a data storage architecture according to the query execution plan such that the query can be executed with respect to the relevant data storage architecture.

Providing (440) one or more runtime metrics corresponding to the executed query may include providing data corresponding to the results of the executed query. In at least one embodiment, providing (440) one or more runtime metrics includes providing elapsed runtime for the query. The runtime metrics may additionally include CPU consumption and memory usage. In at least one embodiment, providing (440) one or more runtime metrics occurs responsive to execution of the query according to the query execution plan. The one or more runtime metrics corresponding to the executed query may additionally include any errors encountered by the query, or any additional data corresponding to the execution of the query. The one or more runtime metrics may additionally include one or more results yielded by execution of the query Updating (450) the set of best plans for this query based on the runtime metrics may include computing a cost or score based on the runtime metrics to compare the query execution plans and keep the top K plans, where K can be a user defined requirement or a metric automatically computed by the machine learning optimizer 110. In at least one embodiment, a clustering algorithm can be used to compute how many plans fall into the best plans category. This process (420-450) is repeated until all query execution plans are processed through the search algorithm.

Generating (460) the common classes based on join order, join type, and access type may include performing a similarity analysis of the best plans generated to compute the common features from those plans that define the classes. In at least one embodiment, generating (460) the common classes include identifying a set of best plans based on one or more queries from the common classes.

Providing (470) feedback of one or more query classes to the runtime ML layer 114 may include updating the model with the new classes. In at least one embodiment, the model is retrained offline; in other embodiments, the model is continuously trained online.

Figure 5:
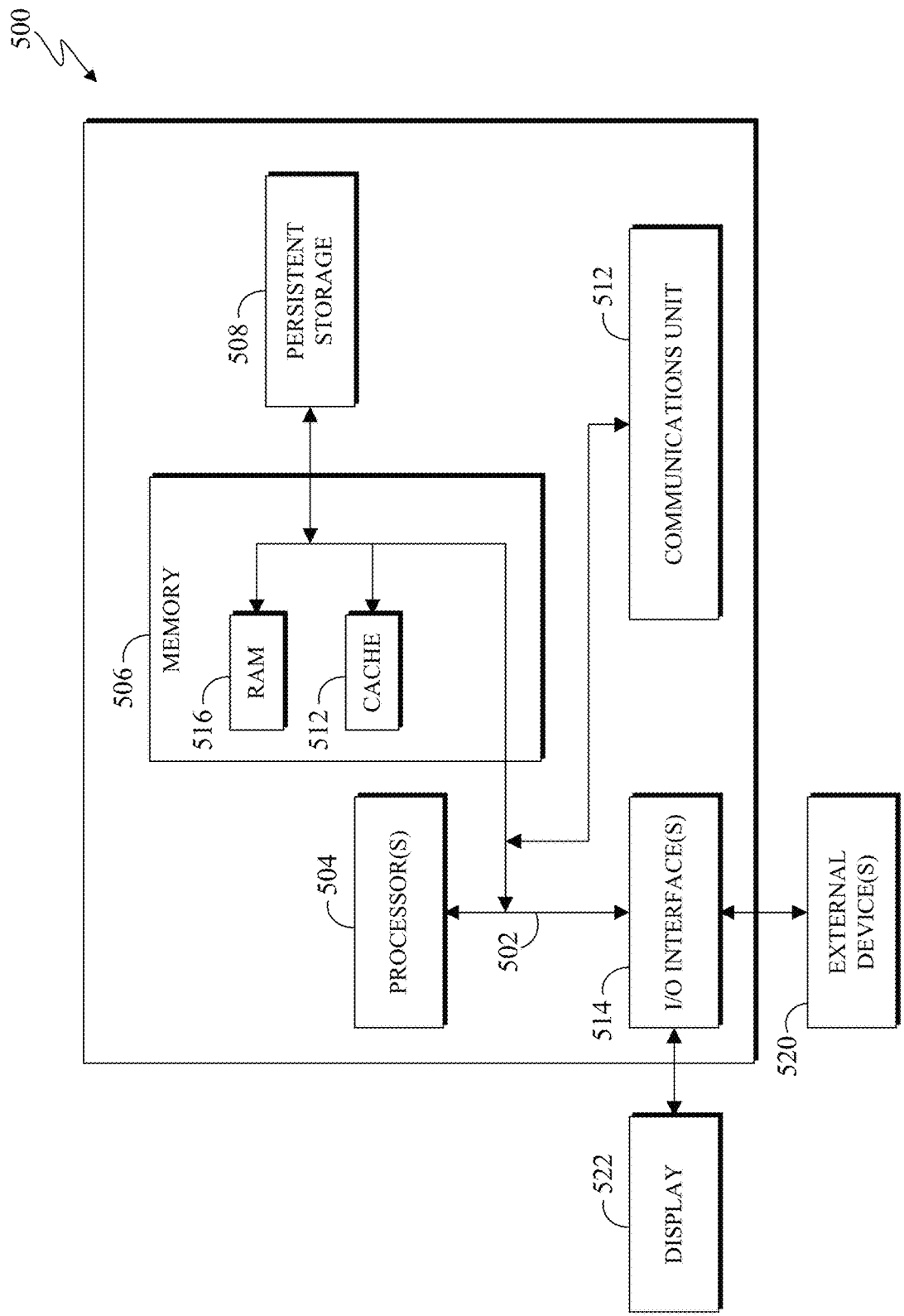
FIG. 5 depicts a block diagram of components of a computer, in accordance with some embodiments of the present invention.

FIG. 5 depicts a block diagram of components of computer 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for query optimization, the method comprising:
   receiving a query and a set of runtime metrics corresponding to the query, wherein the query includes a set of elements;
   processing the set of elements and the set of runtime metrics to identify one or more possible query classifications associated with the query;
   determining a query execution plan for the query according to the identified one or more possible query classifications associated with the query, wherein the query execution plan is a combination of two or more existing single query execution plans for executing respective queries corresponding to each of the identified one or more possible query classifications; and
   executing the query according to the determined query execution plan.

2. The computer implemented method of claim 1, further comprising:
   providing one or more runtime metrics corresponding to the executed query.

3. The computer implemented method of claim 1, wherein each element of the set of elements corresponds to a word or term.

4. The computer implemented method of claim 1, wherein processing the set of elements and the set of runtime metrics to identify one or more possible query classifications includes comparing the set of encoded elements and the set of runtime metrics to one or more sets of elements and one or more sets of runtime metrics corresponding to one or more additional queries, wherein the additional queries are each associated with a classification.

5. The computer implemented method of claim 1, wherein the set of runtime metrics includes elapsed time and memory usage.

6. The computer implemented method of claim 1, wherein each classification corresponds to a join order and an access type.

7. The computer implemented method of claim 1, further comprising generating a set of encoded elements corresponding to the set of elements.

8. A computer program product for query optimization, the computer program product comprising:
   one or more computer readable storage media and program instructions stored on the one or more computer readable storage media, the program instructions comprising instructions to:
   receive a query and a set of runtime metrics corresponding to the query, wherein the query includes a set of elements;
   process the set of elements and the set of runtime metrics to identify one or more possible query classifications associated with the query;
   determine a query execution plan for the query according to the identified one or more possible query classifications associated with the query, wherein the query execution plan corresponds to a combination of two or more existing single query execution plans for executing respective queries corresponding to each of the identified one or more possible query classifications; and
   execute the query according to the determined query execution plan.

9. The computer program product of claim 8, further comprising instructions to:
   provide one or more runtime metrics corresponding to the executed query.

10. The computer program product of claim 8, wherein each element of the set of elements corresponds to a word or term.

11. The computer program product of claim 8, wherein instructions to process the set of elements and the set of runtime metrics to identify one or more possible query classifications include instructions to compare the set of encoded elements and the set of runtime metrics to one or more sets of elements and one or more sets of runtime metrics corresponding to one or more additional queries, wherein the additional queries are each associated with a classification.

12. The computer program product of claim 8, wherein the set of runtime metrics includes elapsed time and memory usage.

13. The computer program product of claim 8, wherein each classification corresponds to a join order and an access type.

14. The computer program product of claim 8, the program instructions further comprising instructions to generate a set of encoded elements corresponding to the set of elements.

15. A computer system for query optimization, the computer system comprising:
 one or more computer processors;
 one or more computer-readable storage media;
 program instructions stored on the computer-readable storage media for execution by at least one of the one or more processors, the program instructions comprising instructions to:
 receive a query and a set of runtime metrics corresponding to the query, wherein the query includes a set of elements;
 process the set of elements and the set of runtime metrics to identify one or more possible query classifications associated with the query;
 determine a query execution plan for the query according to the identified one or more possible query classifications associated with the query, wherein the query execution plan corresponds to a combination of two or more existing single query execution plans for executing respective queries corresponding to each of the identified one or more possible query classifications; and
 execute the query according to the determined query execution plan.

16. The computer system of claim 15, further comprising instructions to:
 provide one or more runtime metrics corresponding to the executed query.

17. The computer system of claim 15, wherein each element of the set of elements corresponds to a word or term.

18. The computer system of claim 15, wherein instructions to process the set of elements and the set of runtime metrics to identify one or more possible query classifications include instructions to compare the set of encoded elements and the set of runtime metrics to one or more sets of elements and one or more sets of runtime metrics corresponding to one or more additional queries, wherein the additional queries are each associated with a classification.

19. The computer system of claim 15, wherein the set of runtime metrics includes elapsed time and memory usage.

20. The computer system of claim 15, the program instructions further comprising instructions to generate a set of encoded elements corresponding to the set of elements.

* * * * *